US006742417B2

(12) United States Patent
Ha

(10) Patent No.: US 6,742,417 B2
(45) Date of Patent: Jun. 1, 2004

(54) SOCKET WRENCH

(76) Inventor: Yong-Su Ha, 201-1204 Hyundae Apt., 1062-2, Anyang 9-dong, Manan-ku, Anyang-city, Kyungki-do (KR)

(*) Notice: Subject to any disclaimer, the term of this patent is extended or adjusted under 35 U.S.C. 154(b) by 0 days.

(21) Appl. No.: 10/246,714

(22) Filed: Sep. 19, 2002

(65) Prior Publication Data

US 2003/0221520 A1 Dec. 4, 2003

(30) Foreign Application Priority Data

Jun. 4, 2002 (KR) .................................... 2002-17810 U

(51) Int. Cl.[7] .............................................. B25B 17/02
(52) U.S. Cl. ...................................... 81/57.36; 81/57.3
(58) Field of Search .................. 81/57.36, 57, 57.24, 81/57.3, 57.31, 57.4, 57.41

(56) References Cited

U.S. PATENT DOCUMENTS

| 3,979,965 | A | * | 9/1976 | Vuceta | .......................... 74/410 |
| 4,063,475 | A | * | 12/1977 | Perkins | ....................... 81/57.22 |
| 4,274,310 | A | * | 6/1981 | Michaud | ...................... 81/57.36 |
| 5,176,047 | A | * | 1/1993 | Bai et al. | ...................... 81/57.3 |
| 5,179,876 | A | * | 1/1993 | Gadea Mantilla | ............ 81/57.3 |

FOREIGN PATENT DOCUMENTS

| GB | 2114036 A | * | 8/1983 | ........... B25B/17/02 |
| KR | 1997-0004988 | | 3/1997 | |

* cited by examiner

Primary Examiner—Lee D. Wilson
Assistant Examiner—David B. Thomas
(74) Attorney, Agent, or Firm—Robert E. Bushnell, Esq.

(57) ABSTRACT

The present invention relates to a socket wrench of simple structure, easy to manufacture, having minimum size and weight on the whole so that one can tighten up or loosen easily, with small strength, a bolt for use in fixing the tire wheel of compact cars such as a jeep and a passenger car to a hub. The socket wrench of the present invention is comprised of an operation axis which is rotated by operation of a handle, a cylinder on the inner surface of which a saw-toothed orbital gear is formed around, a first transmission which is installed within the cylinder for reducing the speed of the torque of the operation axis firstly while strengthening the torque, a second transmission for reducing the speed of the torque secondly while strengthening the torque, thereby rotating, with strong force, a socket for receiving a bolt to be tightened or loosened, and an auxiliary socket which is fixed to a bracket that is extended from a front cap installed in the line end of the cylinder, for receiving other bolt adjacent to the bolt to be tightened or loosened so that the cylinder is not vibrated upon usage.

20 Claims, 6 Drawing Sheets

SOCKET WRENCH

CLAIM OF PRIORITY

This application makes reference to, incorporates the same herein, and claims all benefits accruing under 35 U.S.C. §119 from my application entitled SOCKET WRENCH filed with the Korean Industrial Property Office on Jun. 4, 2002 and there duly assigned Serial No. 2002-0017810.

BACKGROUND OF THE INVENTION

1. Field of the Invention

The present invention relates to a socket wrench and more particularly to a compact socket wrench which generates strong torque.

2. Description of the Related Art

For the conventional socket wrench, Korean Utility Model Application No. 97-4988 to the applicant of the present invention discloses a wrench having a cylinder, first, second and third transmissions which include a central gear and epicyclic gears, and a socket. The parts on which the second and third epicyclic gear are mounted are cylinder-shaped and a safety device is installed in such a way that the safety device passes through the upper surface of an auxiliary socket. The whole manufacturing process for such a structure as well as the second and third transmissions is very complicated and difficult. Furthermore, as the wrench with such a structure is relatively heavy in its weight and big in its size, it is not suitable for an ordinary person to use the wrench in tightening or loosening a bolt or nut for fixing the tire wheel of compact cars such as a jeep and a passenger car to a hub. Also, as the socket and the third transmission are formed in a body, the socket is not replaceable. Thus, different socket wrenches having different size openings should be manufactured and used to fit different sizes of nuts or bolts.

SUMMARY OF THE INVENTION

It is therefore an object of the present invention to provide a socket wrench which can be easily used by a user in tightening or loosening a bolt or nut.

It is another object to provide a socket wrench whose manufacturing process and structure are simple.

It is also an object to provide a socket wrench which can be used regardless of the specification of a bolt or nut to be tightened or loosened.

It is further an object to provide a socket wrench which is small and light.

It is still further an object to provide a socket wrench which can be immediately detected whether a bolt or nut is tightened completely.

It is yet further an object to provide a socket wrench having an auxiliary socket the fixed location of which is easily adjustable.

It is another object to provide an improved socket wrench set.

The socket wrench having features of the present invention may be constructed with a cylinder having a first open end and a second open end and having an inner surface having first teeth, a first cap covering the first open end, having a bracket which is extended from the first cap and a first hole on its center, a second cap covering the second open end and having a second hole on its center, an axis which is inserted in the second hole of the second cap and has second teeth on an outer surface of an end part of the axis, an auxiliary socket which is mounted on the bracket for assisting in maintaining a position of the cylinder and preventing a vibration of the cylinder when the socket wrench is in use, a mounted location of which is adjustable by moving the auxiliary socket on the bracket, a first transmission comprising a first plate which has first pins protruding from one side of said first plate, first epicyclic gears which are mounted on the first pins and engage with the first teeth of the cylinder and the second teeth of the axis, and a central gear which is mounted on the other side of the first plate, a second transmission comprising a second plate which has second pins protruding from one side of said second plate, second epicyclic gears which are mounted on the second pins and engage with the central gear and the first teeth of the cylinder, and a connecting part which protrudes from the other side of the second plate, is inserted in the first hole of the first cap, and is exposed out of the first cap for releasably connecting to a main socket, and a handle which is mounted on the axis.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
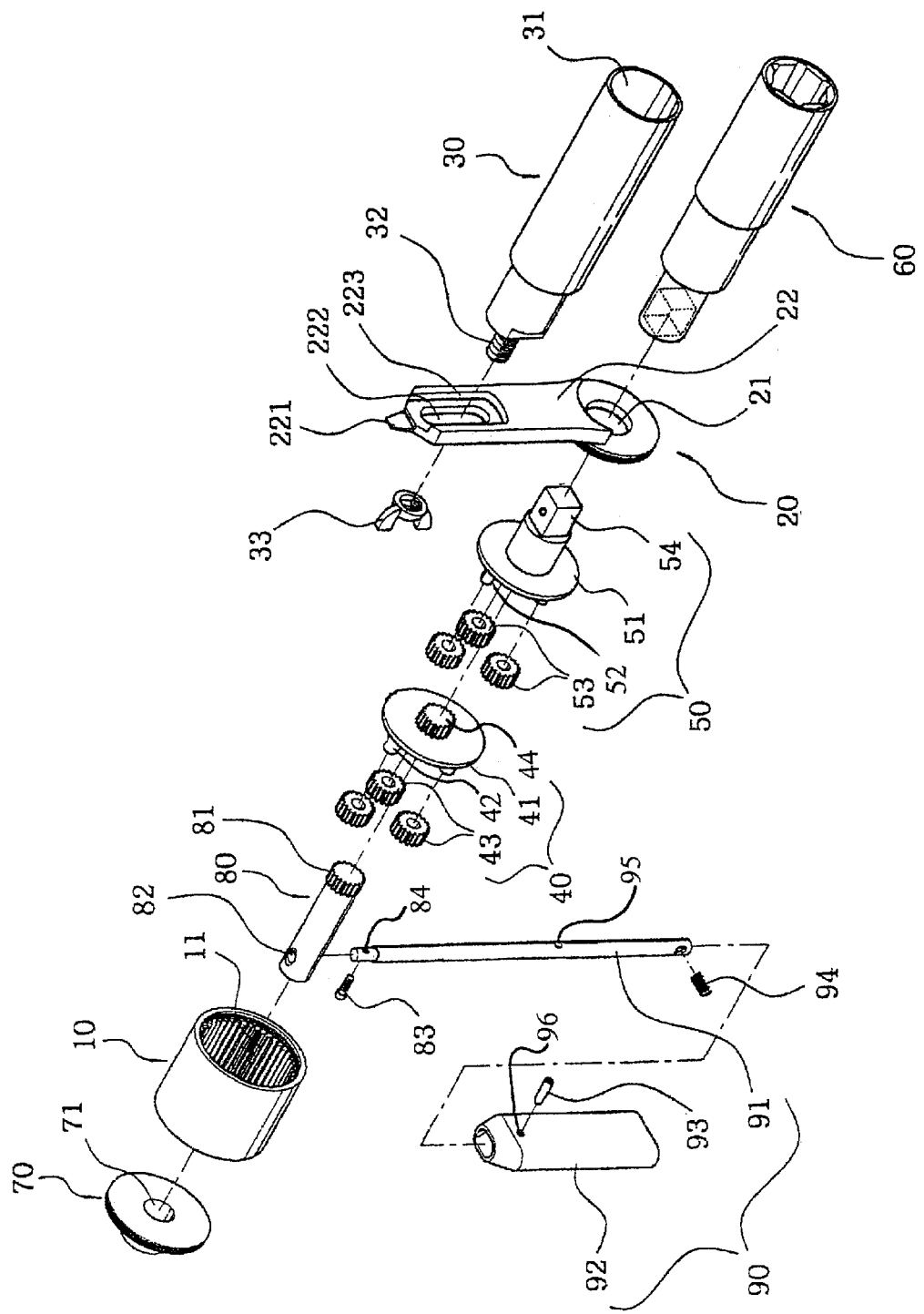
FIG. 1 is an exploded view of a preferred embodiment of a socket wrench.

A detailed structure of the present invention will now be described with reference to the accompanying drawings. In the following description, same drawing reference numerals are used for the same elements even in different drawings.

Figure 2:
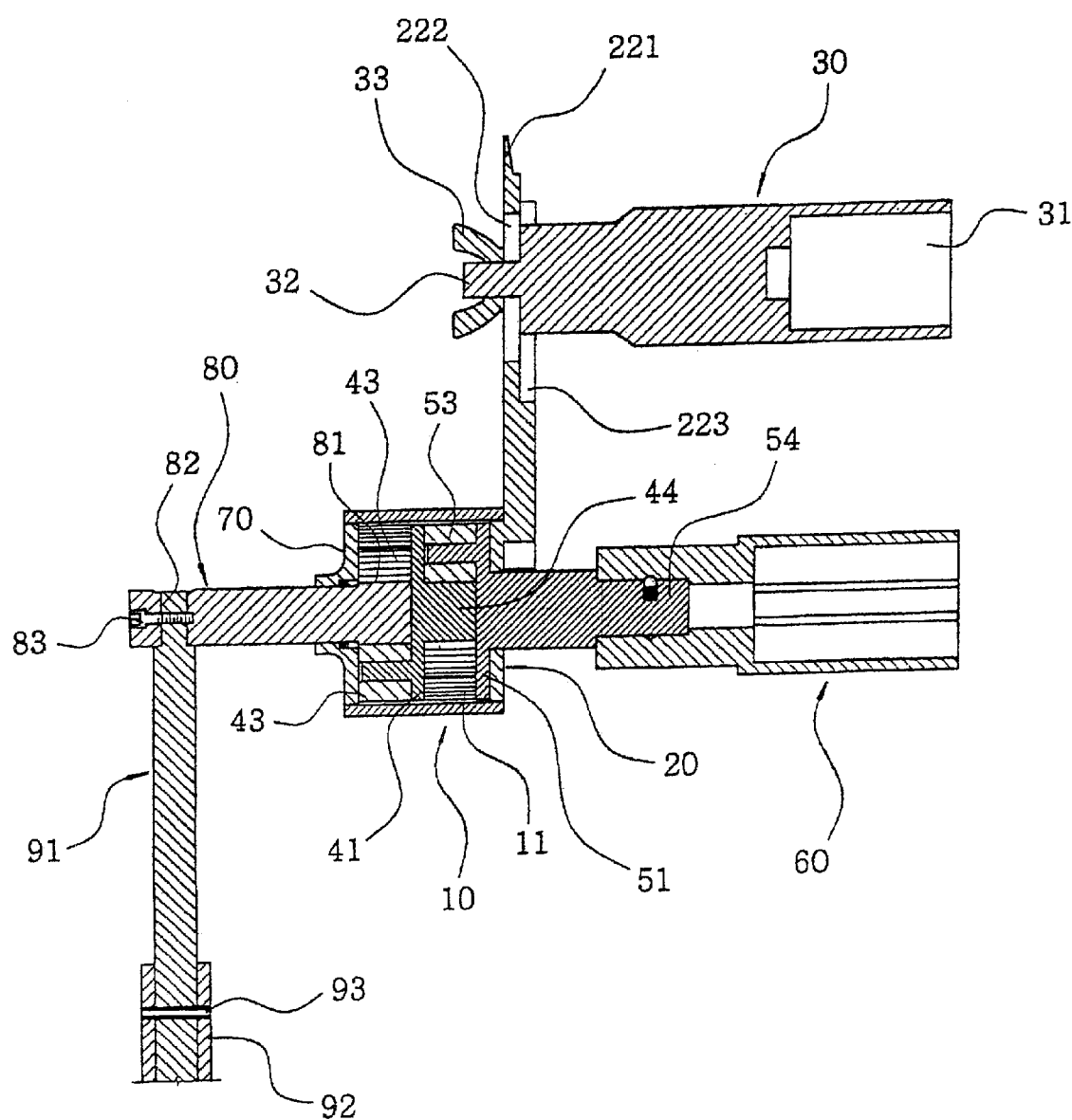
FIG. 2 is a cross-sectional view of the socket wrench.

With reference to FIG. 1 and FIG. 2, a socket wrench has a cylinder 10 both ends of which are in open. An inner surface of the cylinder 10 is provided with a saw-toothed orbital gear 11.

A front cap 20 is installed on one end (front end) of the cylinder 10 and covers the front end of the cylinder 10. The front cap 20 is preferably disk-shaped and has a hole 21 in its center.

A bracket 22 is extended from the front cap 20. At the upper end of the bracket a driver tip 221 can be formed to be used as a tool for disjoining a wheel cap of a tire. The bracket 22 has a hole, preferably a longitudinal hole 22, for receiving an auxiliary socket 30.

The auxiliary socket 30 has a screw part 32 to be inserted into the longitudinal hole 222 of the bracket 22 and a cylinder-shaped socket groove 31. The screw part 32 which is inserted in the longitudinal hole 222 and exposed to a rear side is attached to the bracket 22 with a nut 33. The auxiliary socket 30 is movable along the longitudinal hole 222 when the nut 33 is loosened. Accordingly, the fixed position of the auxiliary socket 30 can be adjusted easily. The socket groove 31 is for receiving a bolt or nut adjacent to a target bolt or nut to be loosened or tightened. Therefore, the auxiliary socket 30 supports the cylinder 10 so that the cylinder 10 may not be vibrated when the socket wrench is in use. The bracket 22 has a guiding groove 223, which is proportional to a diameter of the auxiliary socket 30, at a periphery of the front surface of the longitudinal hole 222. The guiding groove 223 guides the movement of the screw part 32 when the fixed position of the auxiliary socket 30 is adjusted. The guiding groove 223 also receives the rear end of the auxiliary socket 30 so that the auxiliary socket 30 may be attached firmly to the bracket 22 when the nut 33 is tightened.

A first transmission 40 and a second transmission 50 are installed within the cylinder 10. The first transmission 40 includes a first transmission plate 41, first axis pins 42, first epicyclic gears 43, and a central gear 44. The first transmission plate 41 is preferably of disk shape. Each of the first axis pins 42 protrudes from the rear surface of the first transmission plate 41 with constant intervals. The first epicyclic gears 43 are installed at these first axis pins 42, respectively. The central gear 44 is mounted on the center of the front surface of the first transmission plate 41.

The second transmission 50 is comprised of the second transmission plate 51 of disk shape, a plurality of the second axis pins 52, a plurality of second epicyclic gears 53, and a connecting part 54. Each of the second axis pins 52 protrudes from the rear surface of the second transmission plate 51 with constant intervals. The second epicyclic gears 53 are installed at these second axis pins 52, respectively. As one of the embodiments of the present invention, FIG. 1 shows three first epicyclic gears and three second epicyclic gears. The connecting part 54 is extended horizontally on the center of the front surface of the second transmission plate 51.

Figure 3:
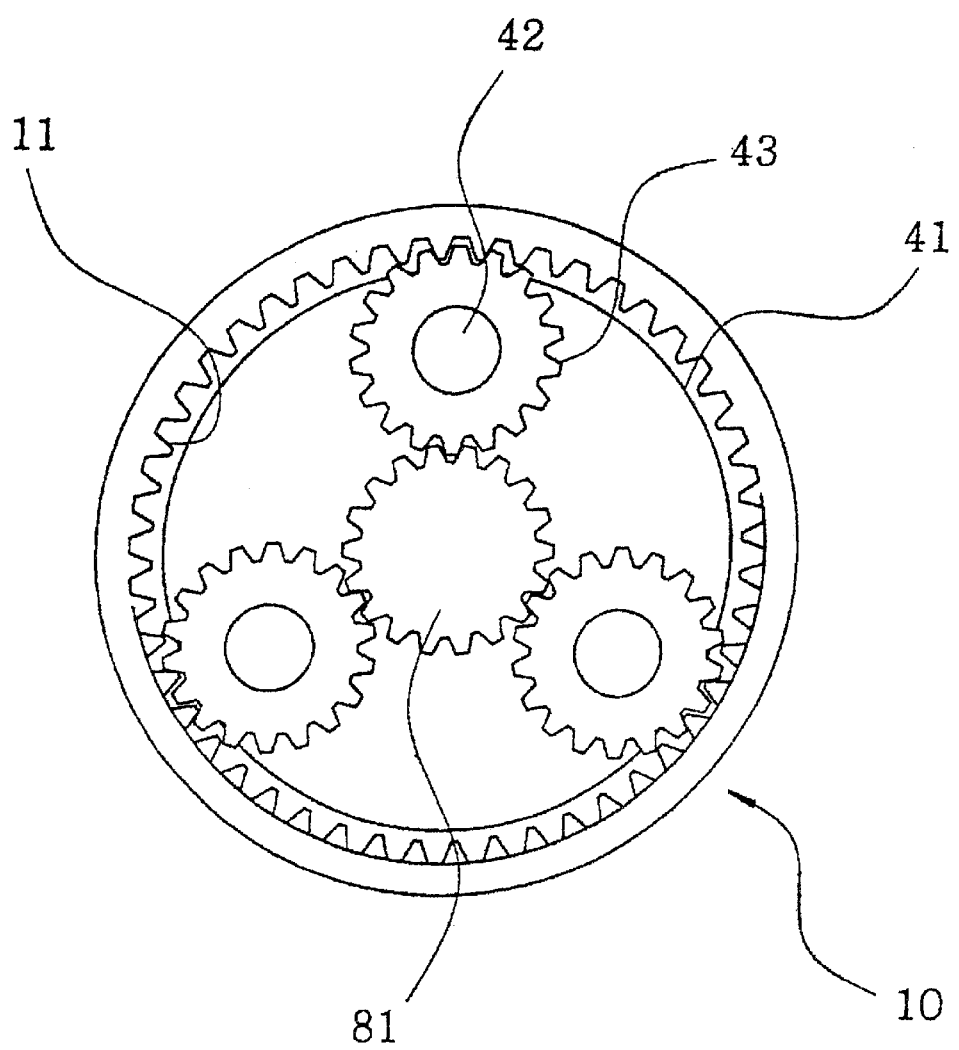
FIG. 3 is a partial front sectional view of the socket wrench.

When installing the first transmission 40 and the second transmission 50 within the cylinder 10, each of the first epicyclic gears 43 should engage with the saw-toothed orbital gear 11 and a saw-toothed gear 81 of an operation axis 80 (see FIG. 3), and each of the second epicyclic gears 53 should engage with the saw-toothed orbital gear 11 and the central gear 44 of the first transmission 40.

Further, the connecting part 54 passes through the hole 21 of the front cap 20, then being exposed to the front side. This exposed connecting part 54 receives a main socket 60. The main socket 60 receives a bolt or nut to be loosened or tightened. That is, the main socket 60 is releasably fitted over the connecting part 54 at its one end and over a bolt or nut at the other end. Since the main socket 60 and the auxiliary socket 60 are replaceable, a user can select and install different sockets in accordance with the specification of a bolt or nut.

A rear cap 70 is installed on the other end, i.e., the rear end, of the cylinder 10 and covers the rear end of the cylinder 10. The rear cap 70 has a hole 71 in its center.

The operation axis 80 has the saw-toothed gear 81, which is inserted into the hole 71 of the rear cap 70, on its front portion. The saw-toothed gear 81 engages with the first epicyclic gears 43. The rear portion of the operation axis 80 has a connection hole 82 through which a handle 90 is fixed vertically.

The handle 90 is comprised of a rod 91, a gripping tube 92, an axis pin 93, and a torque spring 94. The gripping tube 92 has preferably an elliptical shape. The rod 91 is inserted into the gripping tube 92. The rod 91 and the gripping tube 92 have pin holes 95 and 96 through which the axis pin 93 is inserted so that the axis pin 93 fixes the middle portion of the rod 91 to the upper portion of the gripping tube 92. The torque spring 94 is installed between the outer surface of the bottom portion of the rod 91 and the inner surface of the bottom portion of the gripping tube 92 for pushing the bottom portion of the rod 91 in the opposite direction. (See also FIG. 5A)

The upper end of a rod 91 is fitted into the connection hole 82, and a setscrew 83 is tightened into a screw hole 84 formed horizontally on the rod 91 at the rear end of the operation axis 80 so that the rod 91 is fixed perpendicularly to the connection hole 82.

Figure 4:
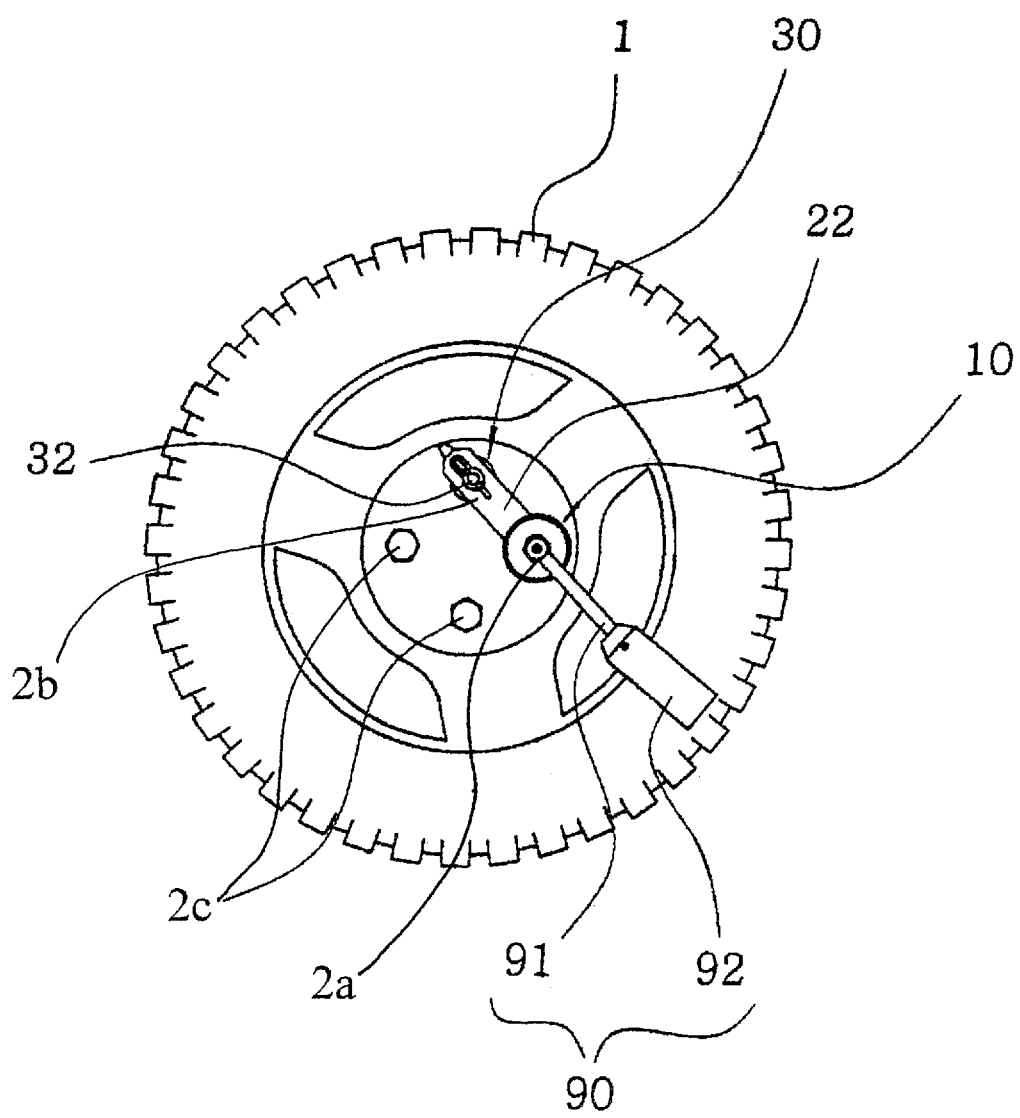
FIG. 4 illustrates the status in use of the socket wrench.
Figure 5A:
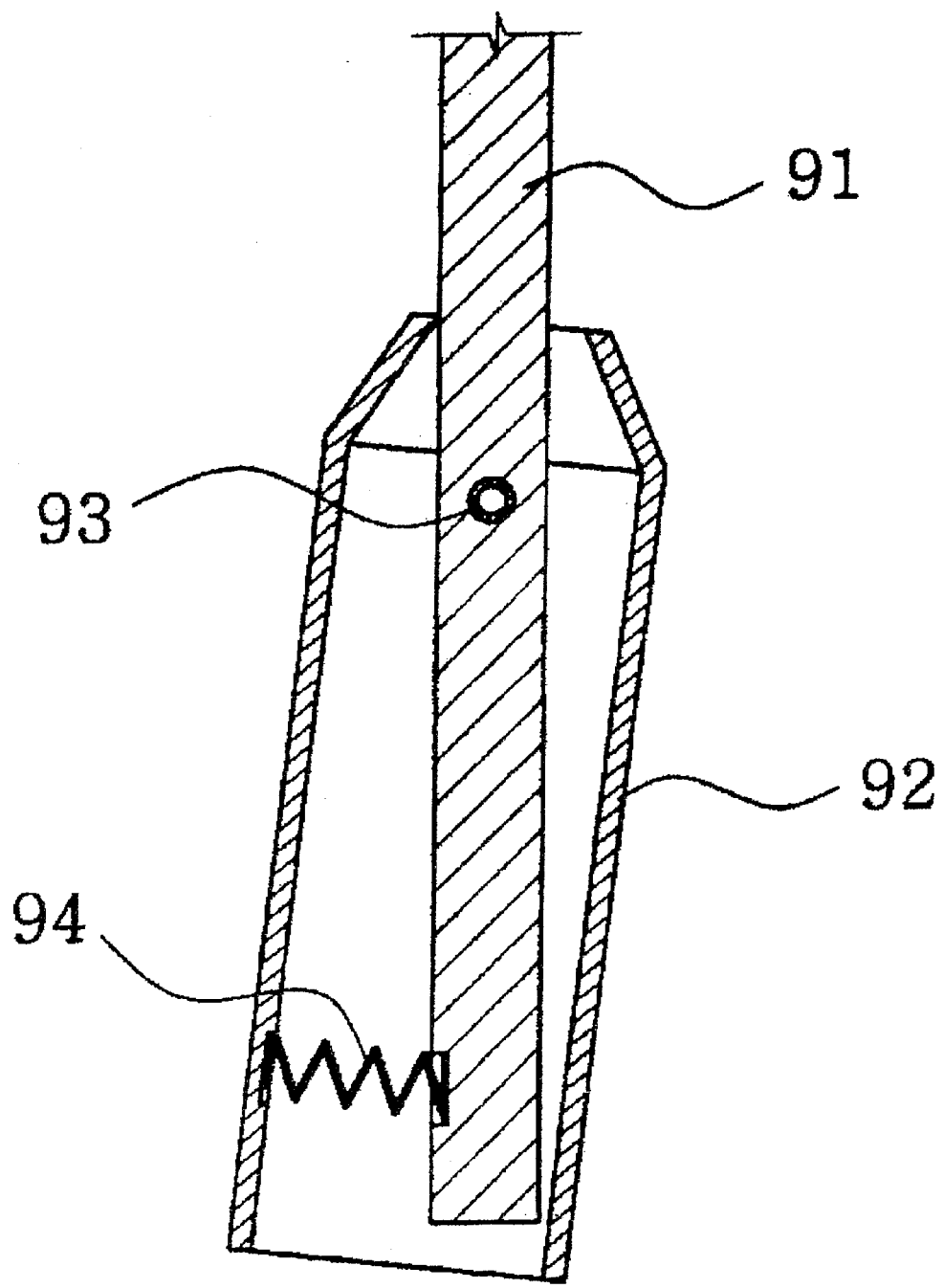
FIGS. 5A and 5B are cross-sectional backside views of the operating status of a handle of the socket wrench.
Figure 5B:
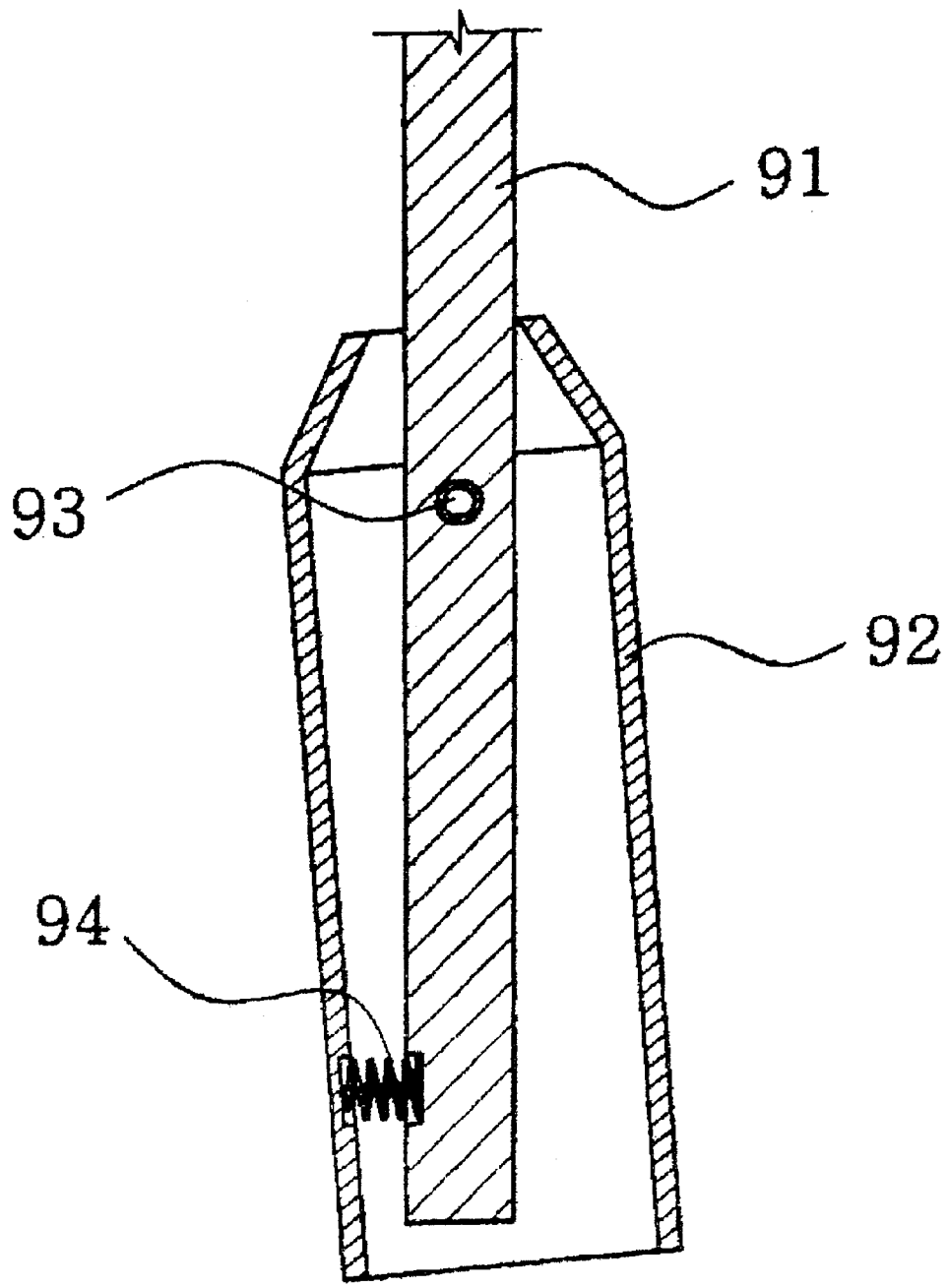

With reference to FIGS. 4, 5A and 5B, a method of using the present invention and a process of the operation of the present invention will be described herein below. When a user wants to tighten a bolt or nut, the user fits the main socket 60 to a target bolt 2a, and the socket groove 31 to the bolt 2b adjacent to the target bolt 2a so that the cylinder 10 is safely attached. Then, the user takes the cylinder 10 with one hand and the gripping tube 92 with the other hand to operate the handle 90 to rotate the operation axis 80 in a forward direction, i.e., the clockwise direction.

Here, the force applied on the gripping tube 92 is transferred directly to the rod 91 by the elasticity of the torque spring 94, rotating the operation axis 80 in the forward direction. The torque of the operation axis 80 obtained in this way is transferred to the first epicyclic gears 43 of the first transmission 40 engaging with the saw-toothed gear 81, rotating the first epicyclic gears 43.

At this moment, as the first epicyclic gears 43 also engage with the saw-toothed orbital gear 11 in the cylinder 10, the first epicyclic gears rotate on their own axes and revolve round the operation axis 80, by which the first transmission plate 41 and the central gear 44 are rotated.

During this process, the torque of the operation axis 80 is reduced firstly in proportional to a gear ratio of the first epicyclic gear 43 and the saw-toothed orbital gear 11, and the first transmission plate 41 is rotated with lower speed than that of the operation axis 80, but its torque gets stronger than that of the operation axis 80.

At this time, the torque of the first transmission plate 41 is transferred to the second epicyclic gears 53 which engage with the central gear 44, rotating these second epicyclic gears 53. As these second epicyclic gears 53 also engage with the saw-toothed orbital gear 11, the second epicyclic gears 53 rotate on their own axes and revolve round the central gear 44.

Here, as the torque of the first transmission plate 40 is reduced secondly in proportional to a gear ratio of the second epicyclic gear 43 and the saw-toothed orbital gear 11, the second transmission plate 51 is rotated with low speed compared with the first transmission plate 41, but its torque gets stronger. The torque strengthened by two times of transmission is used in rotating the main socket 60 fixed to the connecting part 54, thereby tightening the bolt 2a that is fitted to the main socket 60.

As is apparent from the foregoing operation, upon the operation of the handle 90 to rotate the operation axis 80 in the forward direction, the torque generated by such operation is transferred to the first and the second transmissions 40 and 50, where the speed of the torque is changed (reduced) firstly and secondly, but its strength is increased. Accordingly, even in case that the force applied to the handle 90 is weak, the bolt 2a is tightened firmly with the great strength.

When the bolt 2a is tightened completely in this manner, the operation axis 80 is not rotated in the forward direction. In this status, even if the force is applied to the gripping tube 92 to operate the handle 90, the handle 90 is not rotated any more. If the applied force is greater than the repulsion of the torque spring 94, the bottom portion of the gripping tube 92 compresses the torque spring 94 and moves so that the inner surface of its bottom portion comes in touch with the outer surface of the bottom portion of the rod 91 as shown in FIG. 5B. When the user detects this, the user stops handling the handle 90. After that, when the gripping tube 92 is released or force is not applied, the gripping tube 92 is moved back, resuming its previous position due to the repulsion of the compressed torque spring 94.

In the meantime, when the user loosens the bolt 2a, the user takes the gripping tube 92 and operates the handle 90 in the opposite direction so that the operation axis 80 is rotated in the reverse direction, i.e., the counterclockwise direction. By this manner the reverse torque is transferred to the first and second transmissions 40 and 50, where the rotation speed is reduced firstly and secondly, but its strength is increased to rotate the main socket 60 reversely. Thus, the user can loosen the bolt 2a easily that is tightened firmly.

Therefore, the socket wrench according to the embodiment of the present invention has lots of advantages. As the torque of the handle is strengthened by the first and second transmissions, and transferred to the socket, and each epicyclic gear is mounted on the transmission plate, the simple structure and manufacturing process are achieved. Furthermore, the size and the weight of the socket wrench of the present invention are remarkably reduced so that everybody can use the socket wrench conveniently.

Also, as the auxiliary socket can be moved in a simple manner and the auxiliary socket and the main socket can be replaced depending on the size of a bolt, the socket wrench of the present invention can be used for different sizes and positions of bolts or nuts.

Furthermore, as whether a bolt or nut is tightened completely is detected immediately by the interaction between the gripping tube and the torque spring, unnecessary waste of force or hand damage is prevented.

Although the foregoing embodiment is explained with reference to the case in which the socket wrench is used in tightening or loosening a bolt for fixing the tire wheel of compact cars such as a jeep and a passenger car to a hub, the socket wrench according to the present invention is not limited necessarily to such case only but it can be used in tightening or loosening other objects including a bolt and a nut for other uses. Also, although the preferred embodiments of the present invention have been described, it will be understood by those skilled in the art that the present invention should not be limited to the described preferred embodiment, but various changes and modifications can be made within the spirit and scope of the present invention as defined by the appended claims.

What is claimed is:

1. A socket wrench, comprising:
 a cylinder having a first open end and a second open end, said cylinder having an inner surface having first teeth;
 a first cap covering said first open end, said first cap having a bracket extended from said first cap, said first cap having a first hole on a center of said first cap;
 a second cap covering said second open end of said cylinder, said second cap having a second hole on a center of said second cap;
 an axis inserted in said second hole of said second cap, said axis having second teeth on an outer surface of an end section of said axis;
 an auxiliary socket mounted on said bracket, a mounted location of said auxiliary socket being adjustable by moving said auxiliary socket on said bracket, said auxiliary socket assisting in maintaining a position of said cylinder and preventing a vibration of said cylinder when said socket wrench is in use;
 a first transmission installed within said cylinder, said first transmission comprising:
  a first plate having first pins protruding from one side of said first plate;
  first epicyclic gears mounted on said first pins, each of said first epicyclic gears engaging with said first teeth of said cylinder and said second teeth of said axis; and
  a central gear mounted on the other side of said first plate;
 a second transmission installed within said cylinder, said second transmission comprising:
  a second plate having second pins protruding from one side of said second plate;
  second epicyclic gears mounted on said second pins, said second epicyclic gears engaging with said central gear and said first teeth of said cylinder; and
  a connecting part protruding from the other side of said second plate, said connecting part inserted in said first hole of said first cap and exposed out of said first cap for releasably connecting to a main socket; and
 a handle mounted on said axis, said handle comprising a gripping tube, a rod inserted into said gripping tube, one end of said rod connected to said axis, and a spring mounted between said gripping tube and said rod.

2. The socket wrench of claim 1, further comprised of:
 said bracket having a longitudinal hole; and
 said auxiliary socket being movable along said longitudinal hole when said mounted location of said auxiliary socket is adjusted.

3. The socket wrench of claim 2, further comprised of:
 said auxiliary socket having a screw part which is inserted into said longitudinal hole; and
 said auxiliary socket attached to said bracket by fastening a nut to said screw part.

4. The socket wrench of claim 3, with said bracket having a second groove which receives said auxiliary socket.

5. The socket wrench of claim 1, with said bracket having a driver tip.

6. A socket wrench set, comprising:
 a socket wrench comprising:
  a cylinder having a first open end and a second open end, said cylinder having an inner surface having first teeth;
  a first cap covering said first open end, said first cap having a bracket extended from said first cap, said first cap having a first hole on a center of said first cap, said bracket having a driver tip;
  a second cap covering said second open end, said second cap having a second hole on a center of said second cap;
  an axis inserted in said second hole of said second cap, said axis having second teeth on an outer surface of an end section of said axis;
  a first transmission comprising:
   a first plate having first pins protruding from one side of said first plate;
   first epicyclic gears mounted on said first pins, each of said first epicyclic gears engaging with said first teeth of said cylinder and said second teeth of said axis; and a central gear mounted on the other side of said first plate;

a second transmission comprising:

a second plate having second pins protruding from one side of said second plate;

second epicyclic gears mounted on said second pins, said second epicyclic gears engaging with said central gear and said first teeth of said cylinder; and a connecting part protruding from the other side of said second plate, said connecting part inserted in said first hole of said first cap and exposed out of said first cap; and a handle mounted on said axis;

a plurality of auxiliary sockets, each of said plurality of auxiliary sockets having a different opening size, each of said plurality of auxiliary sockets being mountable to said bracket, a mounted location of said auxiliary socket being adjustable by moving said auxiliary socket on said bracket, said auxiliary socket assisting in maintaining a position of said cylinder when said socket wrench is in use by engaging with a second object which is adjacent to a first object to be tightened or loosened; and a plurality of main sockets, each of said sockets having one end releasably engaging with said connecting part and the other end releasably engaging with said first object, each of said main sockets having a different opening size.

7. The socket wrench of claim 6, with said bracket having a longitudinal hole, said auxiliary socket being movable along said longitudinal hole when a location of said auxiliary socket is adjusted.

8. The socket wrench of claim 7, with each of said auxiliary sockets having a screw part which is inserted into said longitudinal hole, said auxiliary socket fastened to said bracket with a nut.

9. The socket wrench of claim 8, with said bracket having a second groove which receives said auxiliary socket.

10. The socket wrench of claim 6, with said handle comprising:

a gripping tube;

a rod inserted into said gripping tube, one end of said rod connected to said axis; and a spring mounted between said gripping tube and said rod.

11. A socket wrench, comprising:

a cylinder having a first open end and a second open end, said cylinder having an inner surface having first teeth;

a first cap covering said first open end, said first cap having a bracket extended from said first cap, said first cap having a first hole on a center of said first cap, said bracket having a driver tip;

a second cap covering said second open end of said cylinder, said second cap having a second hole on a center of said second cap;

an axis inserted in said second hole of said second cap, said axis having second teeth on an outer surface of an end section of said axis;

an auxiliary socket mounted on said bracket, a mounted location of said auxiliary socket being adjustable by moving said auxiliary socket on said bracket, said auxiliary socket assisting in maintaining a position of said cylinder and preventing a vibration of said cylinder when said socket wrench is in use;

a first transmission installed within said cylinder, said first transmission comprising:

a first plate having first pins protruding from one side of said first plate;

first epicyclic gears mounted on said first pins, each of said first epicyclic gears engaging with said first teeth of said cylinder and said second teeth of said axis; and a central gear mounted on the other side of said first plate;

a second transmission installed within said cylinder, said second transmission comprising:

a second plate having second pins protruding from one side of said second plate;

second epicyclic gears mounted on said second pins, said second epicyclic gears engaging with said central gear and said first teeth of said cylinder; and a connecting part protruding from the other side of said second plate, said connecting part inserted in said first hole of said first cap and exposed out of said first cap for releasably connecting to a main socket; and a handle mounted on said axis.

12. The socket wrench of claim 11, further comprised of:

said bracket having a longitudinal hole; and said auxiliary socket being movable along said longitudinal hole when said mounted location of said auxiliary socket is adjusted.

13. The socket wrench of claim 12, further comprised of:

said auxiliary socket having a screw part which is inserted into said longitudinal hole; and said auxiliary socket attached to said bracket by fastening a nut to said screw part.

14. The socket wrench of claim 13, wherein said bracket has a second groove which receives said auxiliary socket.

15. The socket wrench of claim 14, wherein said handle comprises:

a gripping tube;

a rod inserted into said gripping tube, one end of said rod connected to said axis; and a spring mounted between said gripping tube and said rod.

16. A socket wrench set, comprising:

a socket wrench comprising:

a cylinder having a first open end and a second open end, said cylinder having an inner surface having first teeth;

a first cap covering said first open end, said first cap having a bracket extended from said first cap, said first cap having a first hole on a center of said first cap;

a second cap covering said second open end, said second cap having a second hole on a center of said second cap;

an axis inserted in said second hole of said second cap, said axis having second teeth on an outer surface of an end section of said axis;

a first transmission comprising:

a first plate having first pins protruding from one side of said first plate;

first epicyclic gears mounted on said first pins, each of said first epicyclic gears engaging with said first teeth of said cylinder and said second teeth of said axis; and a central gear mounted on the other side of said first plate;

a second transmission comprising:

a second plate having second pins protruding from one side of said second plate;

second epicyclic gears mounted on said second pins, said second epicyclic gears engaging with said central gear and said first teeth of said cylinder; and a connecting part protruding from the other side of said second plate, said connecting part inserted in said first hole of said first cap and exposed out of said first cap; and a handle mounted on said axis, said handle comprising a gripping tube, a rod inserted into said gripping tube, one end of said rod connected to said axis, and a spring mounted between said gripping tube and said rod, a plurality of auxiliary sockets, each of said plurality of auxiliary sockets having a different opening size, each of said plurality of auxiliary sockets being mountable to said bracket, a mounted location of said auxiliary socket being adjustable by moving said auxiliary socket on said bracket, said auxiliary socket assisting in maintaining a position of said cylinder when said socket wrench is in use by engaging with a second object which is adjacent to a first object to be tightened or loosened; and a plurality of main sockets, each of said sockets having one end releasably engaging with said connecting part and the other end releasably engaging with said first object, each of said main sockets having a different opening size.

17. The socket wrench of claim 16, wherein said bracket has a longitudinal hole, and said auxiliary socket is movable along said longitudinal hole when a location of said auxiliary socket is adjusted.

18. The socket wrench of claim 17, wherein each of said auxiliary sockets has a screw part which is inserted into said longitudinal hole, and said auxiliary socket is fastened to said bracket with a nut.

19. The socket wrench of claim 18, wherein said bracket has a second groove which receives said auxiliary socket.

20. The socket wrench of claim 19, wherein said bracket has a driver tip.

* * * * *